US008952797B2

(12) United States Patent
Shuster

(10) Patent No.: US 8,952,797 B2
(45) Date of Patent: Feb. 10, 2015

(54) TACTILE ALERTING MECHANISM FOR PORTABLE COMMUNICATIONS DEVICE

(71) Applicant: Gary Stephen Shuster, Fresno, CA (US)

(72) Inventor: Gary Stephen Shuster, Fresno, CA (US)

( * ) Notice: Subject to any disclaimer, the term of this patent is extended or adjusted under 35 U.S.C. 154(b) by 0 days.

(21) Appl. No.: 14/053,460

(22) Filed: Oct. 14, 2013

(65) Prior Publication Data

US 2014/0045554 A1 Feb. 13, 2014

Related U.S. Application Data

(63) Continuation of application No. 12/732,681, filed on Mar. 26, 2010, now Pat. No. 8,558,677.

(60) Provisional application No. 61/163,660, filed on Mar. 26, 2009.

(51) Int. Cl.
*H04B 3/36* (2006.01)
*H04M 1/02* (2006.01)
*G08B 6/00* (2006.01)
*H04M 19/04* (2006.01)

(52) U.S. Cl.
CPC .............. *H04M 1/026* (2013.01); *G08B 6/00* (2013.01); *H04M 1/0241* (2013.01); *H04M 19/04* (2013.01); *H04M 1/0208* (2013.01); *H04M 19/047* (2013.01)
USPC .................. 340/407.1; 340/407.2; 340/691.1; 340/691.7; 340/4.12; 455/567

(58) Field of Classification Search
CPC ......... G08B 5/00; G08B 6/00; H04M 19/047; H04M 1/0241
See application file for complete search history.

(56) References Cited

U.S. PATENT DOCUMENTS

| 4,421,953 | A | 12/1983 | Zielinski |
| 5,005,513 | A | 4/1991 | Van Patten et al. |
| 5,267,363 | A * | 12/1993 | Chaffee ............................ 5/710 |
| 5,515,033 | A * | 5/1996 | Matarazzo .................. 340/573.3 |
| 5,582,127 | A | 12/1996 | Willis et al. |
| 6,067,018 | A * | 5/2000 | Skelton et al. ............. 340/573.3 |
| 6,195,039 | B1 * | 2/2001 | Glass, Jr. .................. 342/357.75 |
| 6,218,958 | B1 | 4/2001 | Eichstaedt et al. |
| 6,304,170 | B1 | 10/2001 | Armstrong et al. |
| 6,943,694 | B1 | 9/2005 | Ellis |
| 7,024,229 | B2 | 4/2006 | Nishimura |
| 7,076,276 | B2 | 7/2006 | Kemppinen |
| 7,099,457 | B2 | 8/2006 | Weiner |
| 7,292,879 | B2 | 11/2007 | Cho |
| 7,385,526 | B1 | 6/2008 | Bullard et al. |
| 7,492,274 | B1 | 2/2009 | Osborne |
| 2002/0145522 | A1 | 10/2002 | Pembroke |
| 2005/0257752 | A1* | 11/2005 | Langer .......................... 119/712 |
| 2006/0012483 | A1 | 1/2006 | Ethington |

(Continued)

*Primary Examiner* — Benjamin C Lee
*Assistant Examiner* — Rajsheed Black-Childress
(74) *Attorney, Agent, or Firm* — Jonathan Jaech; Snell & Wilmer L.L.P.

(57) ABSTRACT

A portable communications device, such as a mobile phone, includes a novel tactile alerting mechanism capable of alerting the user of an incoming communication or other event. In some embodiments, a mechanical actuator causes a rod or lever to pulsate, rotate, or protrude out of a static housing for the communications device. In other embodiments, a pneumatic actuator inflates a bladder that protrudes out of the housing. The alerting mechanism may be configured as a movable part of a decorative fanciful housing for the communications device.

18 Claims, 3 Drawing Sheets

(56) References Cited

U.S. PATENT DOCUMENTS

| | | |
|---|---|---|
| 2007/0053523 A1 | 3/2007 | Iuliis et al. |
| 2008/0125006 A1 | 5/2008 | Yu et al. |
| 2008/0252476 A1 | 10/2008 | Cosgrove |
| 2008/0266118 A1 | 10/2008 | Pierson et al. |
| 2009/0189746 A1 | 7/2009 | Ullrich et al. |
| 2010/0090828 A1 | 4/2010 | Blanchard |

* cited by examiner

TACTILE ALERTING MECHANISM FOR PORTABLE COMMUNICATIONS DEVICE

CROSS-REFERENCE TO RELATED APPLICATIONS

This patent application is a continuation of U.S. patent application Ser. No. 12/732,681, now U.S. Pat. No. 8,558,677, which claims the benefit of U.S. Provisional Patent Application No. 61/163,660, filed Mar. 26, 2009, which is specifically incorporated by reference herein in its entirety.

BACKGROUND

1. Field

The present disclosure is directed towards a mobile communications device that includes a component for providing a tactile alert signal to the user.

2. Description of the Related Art

Mobile communications devices, for example, mobile telephones, typically include various signaling components to alert users when an incoming communications signal or message is received. Signaling components are typically configured to provide three types of alert signals: visible alerts, such as messages displayed on a display screen, or flashing lights; audible alerts, such as ringtones, and tactile alerts, such as vibrating the device using a motor to drive an unbalanced load inside of the device housing. Tactile alerts are useful for providing alerts when visible or audible alerts are not desirable or effective, such as when a mobile phone is in the user's pocket and the user is in a location where audible alerts are either forbidden or can't reliably be heard because of ambient noise levels. However, in many circumstances, such as when a cellular phone is placed inside a purse or loose-fitting clothing, the vibration of the communications device is not perceptible by the user. Visible alerts are also not perceptible in similar circumstances. The user may therefore unintentionally fail to respond to alert signals for incoming messages.

In addition, mobile communications devices are often encased in functionally designed, sleek, compact housings to enhance portability and durability of the device. However, functionally designed housings tend to be quite similar in appearance, and do not by their outward appearance reflect the unique personalities and preferences of their users, or excite consumer interest in the devices. The same can be said for tactile alerting features of these devices, which are very uniform across the marketplace and therefore also fail to attract consumer interest despite their functional merits.

It would be desirable, therefore, to provide a portable mobile communications device, for example, a wireless mobile phone, with tactile alerting features that overcome these and other limitations of the prior art.

SUMMARY

A portable mobile communications device, for example, a wireless mobile phone may be equipped with an expandable component that is responsive to incoming signals to provide a mechanical output alerting the user that the incoming signal has been received. Expandable components may include, for example, an inflatable air-filled bladder or a mechanically movable attachment coupled to the communications device processor and powered by a motor. In one embodiment, a cellular phone "ring" signal triggers the inflation of an air-filled bladder. In an alternative embodiment, a mechanically deployable mechanical member rotates and/or slides from a position inside (or against) the device housing to a position well outside of the housing. Among other implementation mechanisms, the deployable mechanical device or inflatable device may deploy once or twice for each alert cycle, or repeatedly, depending on parameters determined by the developer or end user. As a result the expandable component provides a much greater range of tactile motion and longer cycle periods than is possible with a conventional vibration motor. The greater range of motion increases the probability that the alert signal will be felt and/or seen by the user. The expandable components may also be configured to provide a more unique, personalized appearance and operation to the communications device.

The mobile communications device may include a wireless communications transceiver circuit configured to transmit and receive wireless communication signals. The circuit may comprise a processor configured to generate an alert signal in selective response to input received by the transceiver circuit, for example, an incoming message alert. The circuit may provide communications and other functions for a wireless mobile telephone, for example, a GSM, TDMA, or CDMA cellular telephone. The communications device may further include a housing enclosing the transceiver circuit, and a mechanical actuator fixed to the housing. The housing may be configured in a portable, hand-held form. The actuator may be controlled by the processor via a motor driver component. Under control of the processor, the actuator moves at least one mechanical member outside of the housing to provide tactile movement exterior to the housing in response to the alert signal from the processor.

The communications device may further include an interface for temporarily disabling operation of the mechanical actuator in response to user input. For example, a switch or button in communication with the processor may be placed on an exterior of the housing. In the alternative, or in addition, the device may include a graphical user interface (GUI) with a menu option operative by user selection to temporarily disable or re-enable the mechanical actuator.

The mechanical member (or members) may be configured in various ways. For example, the member may comprise a rigid component rotating around a pivot fixed to the housing, or a rigid piece sliding along a guide fixed relative to the housing. The mechanical member may have an elastic portion that is deformed by the actuator to provide the movement exterior to the housing. For example, the member may include an inflatable elastic bladder fixed to the housing. The actuator may pump a fluid to inflate the bladder. The communications device may further include a valve configured to deflate the bladder by releasing fluid.

A motion controller controlling the actuator may be configured to drive the mechanical member gradually to a fully extended position, and then hold the at least one member in the extended position for a period of time up to the entire duration of the alert signal, or until being manually reset by the user. In the alternative, or in addition, a motion controller controlling the actuator may be configured to drive the at least one member in a pulsating movement between at least two different positions. For example, the moving member when providing an alert may resemble a waving arm, or a fluttering wing.

The actuator may drive the mechanical member using an electromotive force. As such, the actuator may comprise a linear or rotary electric motor. In the alternative, or in addition, the actuator may drive the member using a fluid for transmission of a driving force. As such, the actuator may comprise a rotary fluid pump, such as an air blower, an air or hydraulic fluid linear actuator, or other fluid pressure device for achieving mechanical motion.

In some embodiments, the housing may be shaped to resemble a fanciful, actual, or stylistic creature, for example, a person, a bird, a penguin, a monkey or ape, a fish, or any other creature or object with externally moving appendages or members. The moving member may be shaped to resemble a moving part of the creature or object. The member may comprise a pair shaped to resemble paired appendages belonging to the creature or object, such as, for example, a pair of arms, legs, fins, wings, flippers or wheels. The member may comprise an inflatable bladder shaped to resemble an expandable exterior part of a creature or object, such as, for example, a belly, a pair of cheeks, a sexual organ, a chest, tires or a balloon. In the alternative, the housing and/or moving member may be configured to have a purely functional appearance not meant to suggest or resemble anything in particular.

The tactile alerts as exemplified above may be deployed alone, or in combination with any or all of a conventional vibrating alert, audible alert, or visible alert. Further details pertinent to embodiments of a mobile communications device with an actuator that moves at least one mechanical member outside of the housing to provide tactile movement exterior to the housing in response to an alert signal are provided in the detailed description that follows.

BRIEF DESCRIPTION OF THE DRAWINGS

In the figures and detailed description that follows, like numerals are used to indicate like elements found in one or more of the figures.

DETAILED DISCLOSURE

Figure 1:
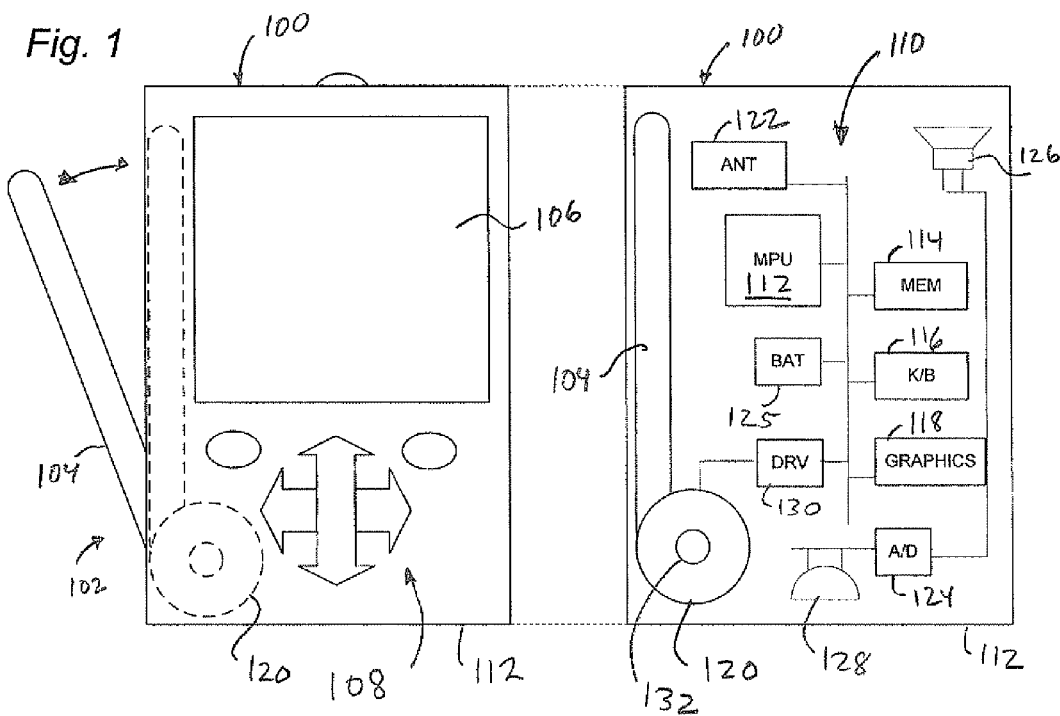
FIG. 1 is schematic exterior view and block diagram showing elements of a mobile communications device with a tactile alerting system including a rotating lever.

FIG. 1 shows elements of a mobile communications device 100, for example a mobile phone, with a tactile alerting system 102 including a rotating lever 104. Lever 104 may be made of any suitable rigid or semi-rigid structural material, for example, a polymer material or metal. Device 100 may include conventional components for a mobile phone, for example, a display screen 106, keypad 108 and transceiver circuit 110, adapted as described below. Device 100 may be configured in a tablet form with an outer housing 112 defining an exterior envelope. Housing 112 optionally functions as a frame to secure components of the device 100 in place. In the alternative, or in addition, a separate frame component may be located inside the housing.

The transceiver circuit 110 may include elements as conventionally used in mobile phones or the like, but adapted to control the device's tactile alerting system 102. Such elements may include, for example, a processor or microprocessing unit 112, and one or more memory devices 114 coupled to the processor for holding program instructions and data. Instructions for controlling the tactile alerting system and other functions of the communications device 100 may be stored in the memory device 114 and loaded into the processor 112 at run time. Further elements may include a user interface 116 for processing signals from a user input device, such as a keypad or touchscreen, into input for the processor 112; and a graphics processor 118 providing a signal to the display device 106 in response to input from the processor 112. The circuit 110 may include an antenna 122 for receiving wireless communications signals coupled to the signal processor 112 or an intermediate processor.

The signal processor may translate digital communications signals or alert tones into audible output via a digital-to-analog processor 124 and speaker 126. Audible input from a microphone 128 may be converted into digital data using the analog-to-digital mode of processor 124. Power components for the circuit may include a battery 125 and associated power electronics for supplying electrical power to elements of circuit 100.

Circuit 100 may further comprise a motor driver 130 and a motor 120 coupled to a drive train (not shown) configured to move a mechanical member 104 through a predetermined range of motion. For example, the member may rotate between a rest position, shown at the right side of FIG. 1, to an extended position as shown at the left side of FIG. 1 around a pivot or bearing 132. The motor 120 may comprise a miniature rotary electrical motor. The drive train may comprise a drive shaft and/or other power transmission components such as, for example, gears, belts, pulleys, connecting rods, cams, sliders, and so forth. For example, a gear train may be used to reduce the speed of rotation of member 104 while increasing the torsion delivered to the member 104 around the bearing 132. The amount of torsion needed may be greater than needed by a conventional oscillating weight, to avoid stalling the drive motor and ensure that the force exerted at the distal end of member 104 is great enough to impart a tactile sensation to the user.

The processor 112 may be programmed to evaluate incoming signals from the antenna and determine when to output an alert signal to system components. For example, in response to an incoming phone call, the processor may generate a code to system components indicating an incoming voice call, Other alert codes may indicate different alert events such as an incoming voice message, text message, or email. System components and/or the processor 112 may respond to alert signals by playing selected ring tones and displaying messages. Furthermore, selected predetermined motion cycles may be output by the motor driver corresponding to particular alert states. For example, the motor driver 130 and or processor 112 may cause the motor 120 to output an oscillating, back and forth motion for incoming phone calls, but a slow movement to hold in an extended position to indicate a new text or voice message received.

Conventional tactile alerting systems may use an oscillating motor controlled using a simple on/off duty cycle to activate and deactivate a vibratory alert. Simple on/off control may not suffice for the tactile altering systems disclosed herein, all of which involve moving a mechanical member through a range of motion exterior to the device housing 112 according to a more complex duty cycle. For example, if a movable touch piece 104 is to be held in an extended position, a mechanical or electro-mechanical control system may be used to stop the drive motor when the touch piece is fully extended from the housing 112, and to reverse the driving force to retract the touch piece to its rest position in or against the housing 112 in response to termination of the alert. For further example, if the movable touch piece is to be moved in a continuous oscillating motion, a mechanical or electro-mechanical control system may be used to return the touch piece to its rest position in response to termination of the alert, by stopping the last motion cycle when the touch piece is in the rest position. If a passive system such as a return spring or elastic membrane is used to return the touch piece to its rest position, a mechanical or electro-mechanical control system may be used to release the return mechanism in response to termination of the alert.

As noted above, it may be desirable to cause the touch member 104 to move through one or more different motion routines depending on the type of alert signal that is generated. Therefore, code modules for causing different movements may be stored in a memory 114 of the device 100, and correlated to different alert conditions via a user configuration interface, or by default. In response to a signal alert from processor 112, a motor driver may initiate a corresponding routine driving the motor through a predetermined cycle. In the alternative, the processor 112 may initiate a control routine providing motion control signals to the driver 130, which the driver simply translates and/or amplifies to provide power inputs to motor 120, thereby causing the motor to perform a predetermined motion cycle.

Figure 2:
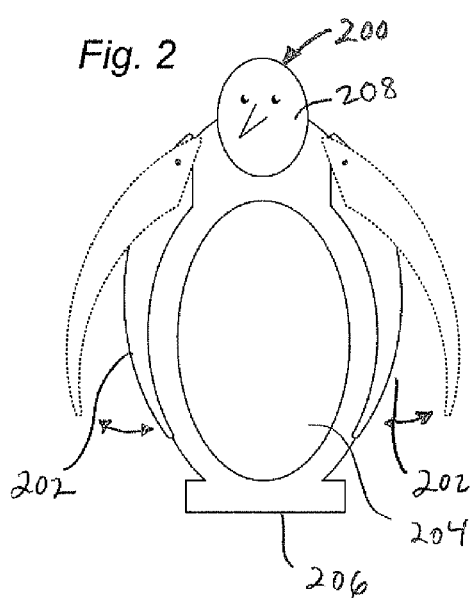
FIG. 2 is a plan view showing a mobile phone in the shape of a fanciful penguin, with a tactile alerting system having rotating levers resembling a pair of penguin flippers.
Figure 3:
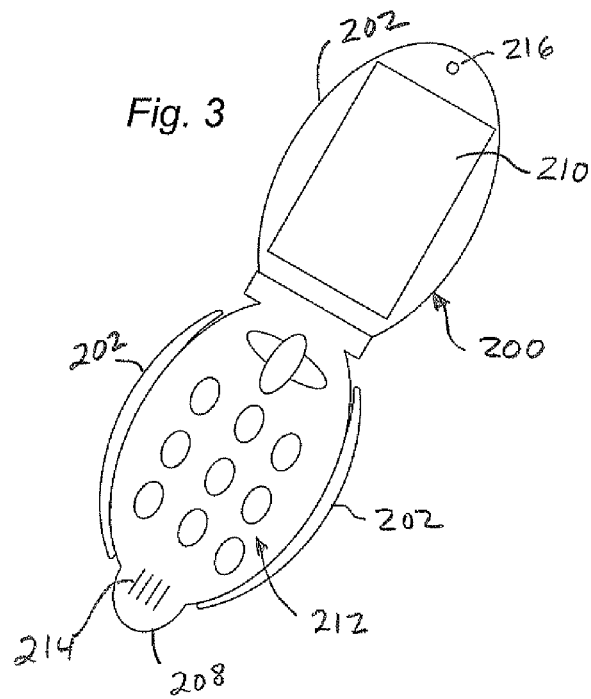
FIG. 3 is an isometric view of the phone shown in FIG. 2, in an open position.

A moving touch member or members may be incorporated in the visual design of a communications device to add visual interest and personality. FIG. 2 shows a mobile phone 200 in the shape of a fanciful penguin, with a tactile alerting system having rotating levers 202 resembling a pair of penguin flippers. The phone 200 may be provided in a clamshell configuration, with a bifold main body 204 housing the transceiver circuitry joined by a hinge 206. FIG. 3 shows the same phone 200 with the clamshell body 204 in an open position, revealing a display screen 210, keypad 212, microphone inlet 214, and speaker outlet 216. The head 208 may be primarily ornamental. The flippers 202 may oscillate between a rest position against the clamshell body and an extended position shown in dotted line in FIG. 2, in response to an alert signal, to provide a tactile and visible alert indicator. When not signaling an alert, the flippers may be held against the phone body 202 as a static design element.

Figure 4A:
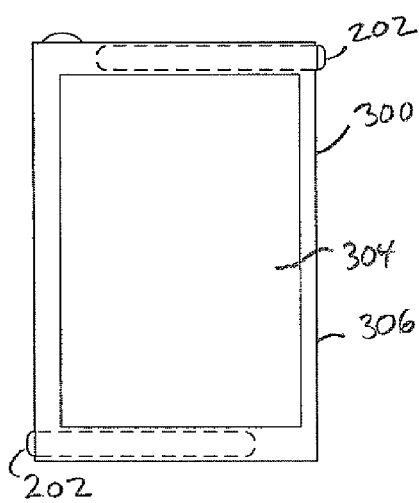
FIGS. 4A-B are plan views showing a mobile phone with a tactile alerting system including multiple sliding rods, wherein the rods are in retracted and extended positions, respectively.
Figure 4B:
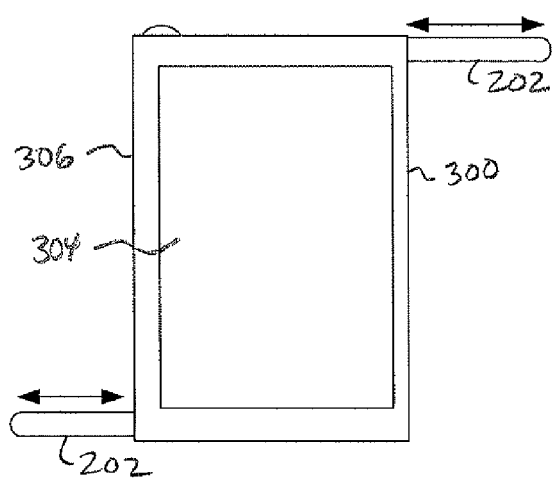

FIGS. 4A-B show a mobile phone 300 in a tablet configuration with a touch screen display 304 supported by a housing 306 enclosing a transceiver circuit as described herein. A tactile alerting system for phone 300 may include multiple sliding rods 302 made of a durable rigid or semi-rigid structural material. FIG. 4A shows the phone 300 with the sliding rods 302 in a retracted position and mostly contained within an interior of the housing 306. FIG. 4B shows the phone 300 with the sliding rods in an extended position, mostly protruding outside of the housing 306. A guide, such as a cylindrical channel or rail, may be disposed inside of the housing to guide movement of the rods in and out of the housing. The rods may be driven by one or more electric motors, which may be rotary or linear in configuration, such as, for example, a solenoid. In the alternative, the phones may comprise one or more fluid driven actuators, such as, for example, a fluid cylinder. A processor housed inside the housing may be programmed to drive the rods in one or more motion cycles to provide a tactile and visible indicator of an alert condition, and previously described.

Figure 5:
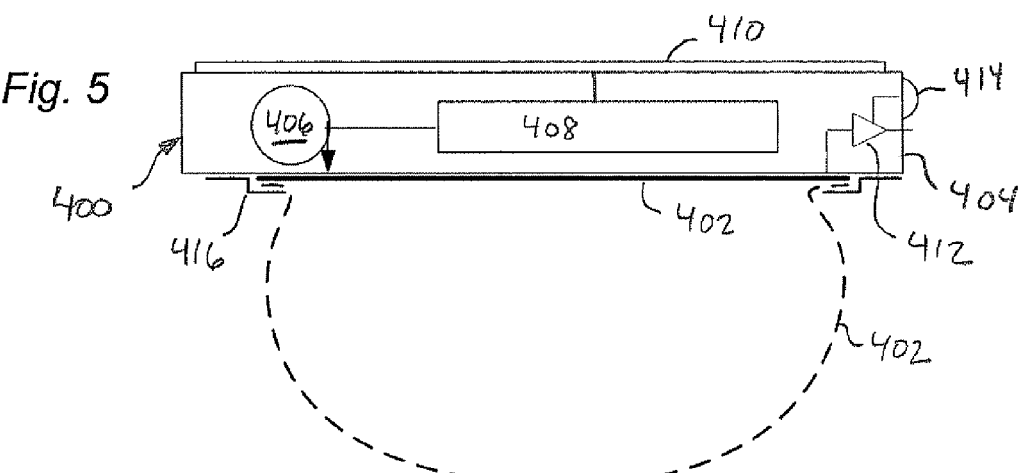
FIG. 5 is a schematic side view showing elements of a mobile communications device with a tactile alerting system comprising an inflatable bladder.

FIG. 5 shows elements of a mobile communications device 400 with a tactile alerting system comprising an inflatable bladder 402. The bladder 404 may be constructed out of any suitable elastic membrane, for example, a natural rubber, butyl rubber, polychloroprene, polyurethane, EPDM, HNBR, or other suitable rubber polymer formulated for high elasticity and mechanical strength. When not inflated, bladder 402 may rest against an outer surface of an outer housing 404 as indicated by the solid line. Another surface of the housing may hold a display 410 for the communications device and optionally a separate user interface device, such as a keypad (not shown). Inflating the bladder using an air pump 406 responsive to an alert signal from a transceiver circuit 408 inside housing 404 may cause the bladder to bulge outward from the housing to any desired inflated shape. An example of an inflated shape is shown by the dashed line in FIG. 5. However, the bladder is not limited to this particular shape, and may be configured in any suitable shape capable of providing a tactile and visible indication of an alert condition. The bladder may be incorporated in a removable assembly with a rigid frame 416, which may be attached to the housing to hold the bladder in position relative to the housing 404, and to seal the interior of the bladder against an air port from pump or blower 406. Back flow through the port may be prevented using a one-way valve (not shown).

A release valve 412 may be provided inside the housing 404 to release air from the bladder to indicate termination of an alert signal, or in response to other input. When opened, pressure from the tensioned bladder membrane may drive air through a fluid channel venting to an exterior of the housing 404. Operation of the valve may be controlled by a solenoid under automatic control of the communications circuit 408. In the alternative, or in addition, the valve may be opened in response to manual input, such as for example, an external button 414 being pressed by a user, or other user input.

Figure 6:
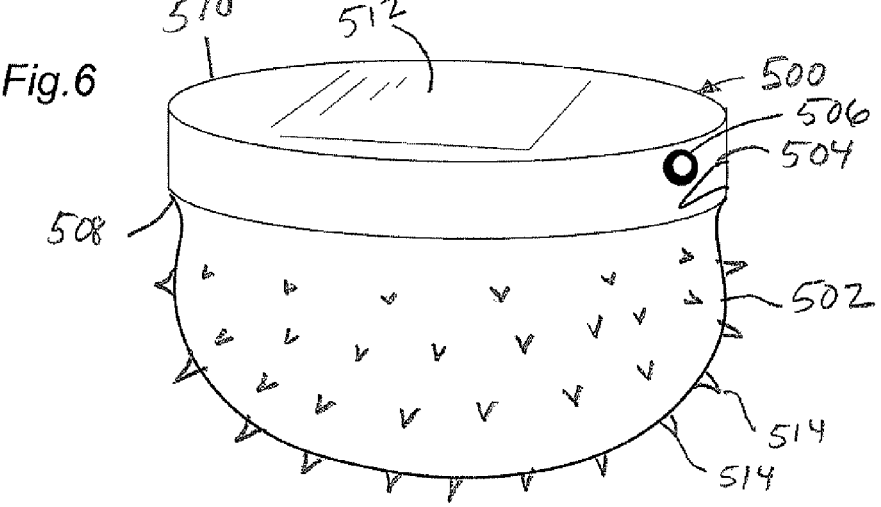
FIG. 6 is an isometric view of a mobile phone of the type shown in FIG. 5, having an inflatable bladder configured to resemble the belly of a pufferfish.

FIG. 6 is an isometric view of a mobile phone 500 of a type similar to that shown in FIG. 5, having an inflatable bladder 502 configured to resemble the belly of a pufferfish. The bladder 502 is shown in an inflated position, after being inflated in response to an alert signal from a transceiver circuit within the housing 510. An air release vent may comprise an opening 504 resembling a pufferfish mouth. A release button 506 coupled to actuate an air release valve inside the housing 510 may be configured to resemble a fish eye. By pressing the fish eye, a user may release air from the bladder, causing it to collapse flat against the underside 508 of the phone housing 510. In the alternative, the phone may be configured to automatically deflate the bladder in response to input indicating a response to the alert signal, for example, input indicating picking up a phone call.

The bladder may incorporate elastic or semi-rigid protrusions 514 to increase tactile and visual stimulation caused by inflation of the bladder. A mechanical release (not shown) may be placed on or near the housing undersurface 508, by which the bladder assembly may be removed to reveal a battery compartment, or for replacement of the bladder.

Although phone 500 is depicted in a tablet configuration with a touch screen 512 on its upper surface, a clamshell configuration is also suitable. Because a clamshell configuration places the display screen and keypad inside the bi-fold of the clamshell, the exterior of the housing may be more easily given a decorative appearance that more closely resembles a pufferfish or other desired creature. In a clamshell configuration, the release valve may be configured so that the bladder deflates automatically in response to opening of the clamshell.

Figure 7:
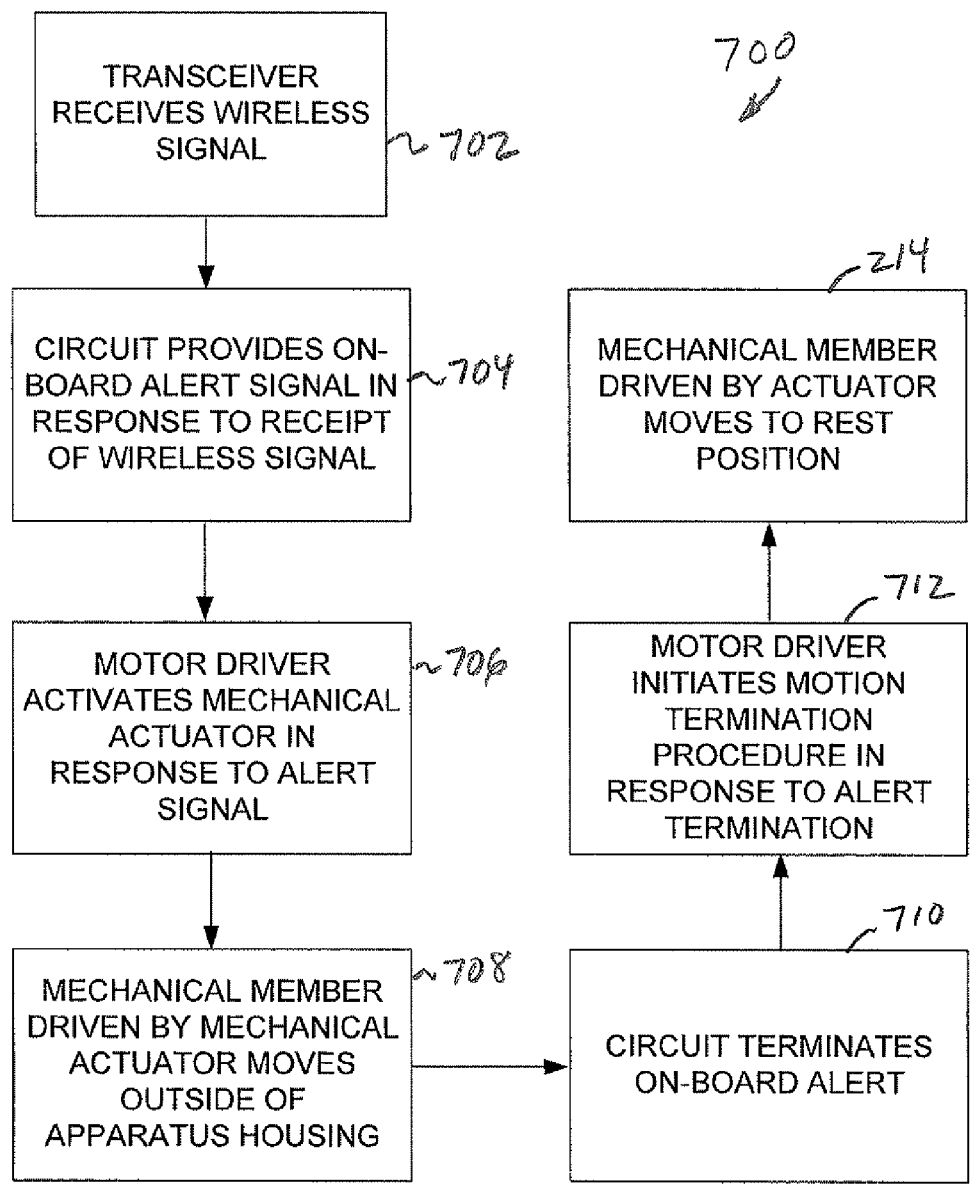
FIG. 7 is a flow chart showing elements of a method for operating a mobile communications device to control a tactile alerting system having a complex duty cycle.

In accordance with the foregoing examples of communications devices with tactile alerting systems, FIG. 7 shows elements of a method 700 for operating a mobile communications device to control a tactile alerting system having a complex duty cycle, as described herein. At 702, the transceiver circuit in the device receives a wireless communications signal, such as, for example, an incoming phone call signal or a mail message transmission. The transceiver circuit may generate a responsive alert signal 704 to other system components, indicating receipt of the signal. At 706, a motor driver of the circuit activates a mechanical actuator configured to drive at least one mechanical member in response to the alert signal, with power supplied by a power source from within the portable communications device.

At 708, the mechanical member moves through a range of motion outside of a housing for the transceiver circuit. This external motion may be non-vibratory in that it includes no tactile high-frequency vibration component, such as generated by prior-art vibrating motors. It may include a oscillating or low frequency pulsating motion cycle, for example, a motion cycle between about one cycle per ten seconds and ten cycles per second. The motion should be clearly visible as well as tactile, and driven by an adequate force to overcome light resistance from loose clothing or the like. For example, a motion cycle may cause a sensation similar to what could be caused by a trapped fluttering bird, when activated while the device is in a pocket of a user's clothing. For further example, the tactile output may resemble a light tapping or sequence of pokes, or a single poking sensation, or a diffuse increase in pressure, depending on the configuration of the mechanical member and selected duty cycle for the alert signal.

At 710, the transceiver circuit terminates the alert signal. Termination may occur in response to a variety of conditions as known in the art, for example the user picking up the call or message, the call going unanswered for a period of time, or the user requesting that the alert be stopped by selecting an "ignore" input or the like. At 712, the circuit initiates a motion termination procedure in response to termination of the alert. The procedure may be designed to return the moving members to their rest position in an efficient fashion. This can be done by driving the members to a rest position using motor power, or powering the drive motor off and releasing a latch or valve that, in turn, releases stored mechanical energy to return the member to a rest position. The moving member is thereby driven back to its designated rest position 714, where it does not interfere with use of the communications device and can be reactivated when needed to provide a tactile indication of further alert signals. The tactile alerting cycle may thereby be repeated as often as desired.

Having thus described illustrative embodiments of tactile alerting mechanisms for portable communications devices, communications devices provided with these mechanisms in various configurations, and a method for operating such devices, an enabling disclosure has been made of subject matter defined by the appended claims.

The invention claimed is:

1. An apparatus, comprising:
 a wireless communications transceiver circuit configured to transmit and receive wireless communication signals as a wireless mobile phone, the circuit comprising a processor configured to generate an alert signal in selective response to input received by the transceiver circuit indicating an incoming call or message for a user of the phone;
 a housing enclosing the transceiver circuit; and
 a mechanical actuator fixed to the housing and controlled by the processor, the actuator moving at least one member outside of the housing to provide movement exterior to the housing in response to the alert signal from the processor, wherein the at least one member comprises an inflatable elastic bladder fixed to the housing that is deformed by the actuator to provide the movement exterior to the housing and is configured to provide, as a result of the movement, a tactile indication of the alert signal to the user of the wireless mobile phone.

2. The apparatus of claim 1, wherein the actuator pumps a fluid to inflate the bladder, and further comprising a valve deflate the bladder by releasing fluid.

3. The apparatus of claim 1, wherein a motion controller controlling the actuator is configured to drive the at least one member gradually to a fully extended position and then hold the at least one member in the extended position.

4. The apparatus of claim 1, wherein a motion controller controlling the actuator is configured to drive the at least one member in a pulsating movement between at least two different positions.

5. The apparatus of claim 1, wherein the actuator drives the at least one member using an electromotive force.

6. The apparatus of claim 1, wherein the actuator drives the at least one member using a fluid for transmission of a driving force.

7. The apparatus of claim 1, wherein the actuator comprises an electric motor.

8. The apparatus of claim 7, wherein the electric motor is a rotary motor.

9. The apparatus of claim 1, wherein the actuator comprises a fluid pump.

10. The apparatus of claim 1, wherein the housing is configured to be hand-held.

11. The apparatus of claim 1, further comprising an interface means for temporarily disabling operation of the mechanical actuator in response to user input.

12. The apparatus of claim 1, wherein the housing is shaped to resemble a fanciful creature.

13. The apparatus of claim 12, wherein the at least one member is shaped to resemble a moving part of the fanciful creature.

14. The apparatus of claim 12, wherein the at least one member comprises a pair shaped to resemble paired appendages belonging to the fanciful creature.

15. A method, comprising:
 generating, by a wireless communications transceiver circuit configured to transmit and receive wireless communication signals as a wireless mobile phone and comprising a processor enclosed in a housing, an alert signal in selective response to input received by the transceiver circuit indicating an incoming call or message for a user of the phone; and
 actuating a mechanical actuator fixed to the housing, by the processor, the actuator moving at least one member outside of the housing to provide tactile movement exterior to the housing in response to the alert signal from the processor, wherein the at least one member comprises an inflatable elastic bladder that is deformed by the actuator to provide the movement exterior to the housing configured to provide a tactile indication of the alert signal to the user of the wireless mobile phone.

16. The method of claim 15, wherein actuating the mechanical actuator causes inflation of the elastic bladder.

17. The method of claim 16, wherein the actuator pumps a fluid to inflate the bladder, and further comprising deflating the bladder opening a valve after the actuating.

18. The method of claim 15, further comprising operating the transceiver circuit as a mobile phone.

* * * * *